United States Patent
Tu et al.

(10) Patent No.: US 9,772,868 B2
(45) Date of Patent: Sep. 26, 2017

(54) METHOD AND SYSTEM FOR HANDLING INTERRUPTS IN A VIRTUALIZED ENVIRONMENT

(71) Applicant: INDUSTRIAL TECHNOLOGY RESEARCH INSTITUTE, Hsinchu (TW)

(72) Inventors: Cheng-Chun Tu, Hsinchu County (TW); Tzi-Cker Chiueh, Taipei (TW); Chao-Tang Lee, Pingtung County (TW)

(73) Assignee: Industrial Technology Research Institute, Hsinchu (TW)

( * ) Notice: Subject to any disclaimer, the term of this patent is extended or adjusted under 35 U.S.C. 154(b) by 419 days.

(21) Appl. No.: 14/488,061

(22) Filed: Sep. 16, 2014

(65) Prior Publication Data
US 2016/0077848 A1    Mar. 17, 2016

(51) Int. Cl.
*G06F 9/455* (2006.01)

(52) U.S. Cl.
CPC ........... *G06F 9/45558* (2013.01); *G06F 2009/45575* (2013.01)

(58) Field of Classification Search
CPC ............ G06F 9/45558; G06F 2009/45575
See application file for complete search history.

(56) References Cited

U.S. PATENT DOCUMENTS

| | | |
|---|---|---|
| 7,853,744 B2 | 12/2010 | Mahalingam et al. |
| 8,151,264 B2 | 4/2012 | Bennett et al. |
| 8,286,162 B2 | 10/2012 | Neiger et al. |
| 8,453,143 B2 | 5/2013 | Mahalingam et al. |
| 8,516,479 B2 | 8/2013 | Hattori et al. |
| 2004/0117532 A1 | 6/2004 | Bennett et al. |

(Continued)

FOREIGN PATENT DOCUMENTS

| | | |
|---|---|---|
| CN | 1648866 A | 8/2008 |
| CN | 103473135 A | 12/2013 |

(Continued)

OTHER PUBLICATIONS

Gordon, Abel et al., ELI: Bare-Metal Performance for I/O Virtualization, *ASPLOS' 12*, Mar. 3-7, 2012, London, England, 12 pgs.

(Continued)

*Primary Examiner* — Nimesh G Patel
(74) *Attorney, Agent, or Firm* — Muncy, Geissler, Olds & Lowe, P.C.

(57) ABSTRACT

An interrupt handling method and a system are provided. An exemplary embodiment of an interrupt handling method in a virtualized environment operable on a computer having one or more CPU cores, includes disabling a virtual machine exit triggers by an interrupt that destined to a virtual machine (VM), via a hypervisor of the virtualized environment. The exemplary method further includes delivering directly one or more interrupts from an I/O virtualization (IOV) device and a virtual device that destined to the VM, while the destined VM is running on one of the one or more CPU cores, otherwise delivering the one or more interrupts to the hypervisor to deliver corresponding one or more virtual interrupts to the destined VM.

20 Claims, 5 Drawing Sheets

(a)

(b)

(56) References Cited

U.S. PATENT DOCUMENTS

| | | | | |
|---|---|---|---|---|
| 2005/0289542 A1* | 12/2005 | Uhlig | ............... | G06F 9/45533 |
| | | | | 718/1 |
| 2012/0331467 A1 | 12/2012 | Neiger et al. | | |
| 2013/0174148 A1 | 7/2013 | Amit et al. | | |
| 2013/0227562 A1* | 8/2013 | Tsirkin | ............... | G06F 9/45558 |
| | | | | 718/1 |
| 2014/0082240 A1* | 3/2014 | Coleman | ............... | G06F 9/4812 |
| | | | | 710/260 |
| 2014/0149979 A1* | 5/2014 | Tsirkin | ............... | G06F 9/4418 |
| | | | | 718/1 |

FOREIGN PATENT DOCUMENTS

| | | |
|---|---|---|
| TW | 201346589 A | 11/2013 |
| TW | 201346730 A | 11/2013 |
| WO | WO 2008/070410 A1 | 6/2008 |
| WO | WO 2013/090202 A1 | 6/2013 |

OTHER PUBLICATIONS

Har'El, Nadav et al., Efficient and Scalable Paravirtual I/O System, *2013 USENIX Annual Technical Conference*, pp. 231-242, 2013.

Jailhouse: A Linux-based Partitioning Hypervisor. URL: http://lwn.net/Articles/574273/ , 1 pg, Last retrieved on Sep. 15, 2014.

Nakajima, Jun, Enabling Optimized Interrupt/APIC Virtualization in KVM, *Intel Open Source Technology Center, KVM Forum 2012*, Nov. 8, 2012, 15 pgs.

Keller, Eric et al., NoHype: Virtualized Cloud Infrastructure without the Virtualization, *ISCA'10*, Jun. 19-223, 2010, Saint-Malo, France, 12 pgs.

* cited by examiner

METHOD AND SYSTEM FOR HANDLING INTERRUPTS IN A VIRTUALIZED ENVIRONMENT

TECHNICAL FIELD

The technical field is related to a method and system for handling interrupts in a virtualized environment.

BACKGROUND

A virtual machine (VM) is a software implementation of a machine (e.g., a computer) that executes programs like a physical machine. Multiple VMs each running on their own operating system (called the guest OS). The guest OSs do not have to be compliant with the hardware making it possible to run different OSs on the same computer, and the guest OSs may share the virtualized hardware resources. A hypervisor, also known as a virtual machine monitor (VMM), is a piece of computer software, firmware or hardware that creates and runs VMs in virtualization environment. A computer on which a hypervisor is running one or more VMs is defined as a host machine. Each virtual machine is called a guest machine. The hypervisor presents the guest OSs with a virtual operating platform and manages the execution of the guest OSs.

A CPU core is in host mode when the hypervisor runs on it and in guest mode when a VM runs on it. A CPU core stays in guest mode until any event, for example such as an interrupt from I/O device(s), timer or other event(s), configured to force a transition into host mode. When transitioning to host mode, the hypervisor takes over, handles the triggering event, delivers the interrupt to the corresponding interrupt handler of the targeted VM, and then re-enters guest mode to resume the VM's execution. When the corresponding interrupt handler associated with the interrupt completes, it acknowledge with an end of interrupt (EOI) signal to the hardware, for example but not limited, it may writes to an EOI register of the corresponding local interrupt controller of a CPU core. Moreover, an interrupt send from one CPU core to the other CPU core is called an inter-processor interrupt (IPI).

A transition from guest mode to host mode is called a VM exit and the transition from host mode to guest mode is a VM entry. The performance overhead of a VM exit/entry lies in the cycles spent in saving and restoring execution contexts and the associated pollution of CPU caches when executing hypervisor code. Some of the existing architecture, such as x86 server architecture, dictates that either every external interrupt causes a VM exit or none of the external interrupts causes a VM exit. This limitation makes it difficult to deliver an interrupt differently depending on whether its target VM is currently running or not.

With increasingly sophisticated hardware support for virtualization, the performance overhead due to I/O virtualization emerged gradually. Therefore, the advent of SR-IOV (Single Root I/O Virtualization), MR-IOV (Multi-Root I/O Virtualization) and para-virtualization allows a VM to reduce the DMA-related virtualization overhead. Nevertheless, in general frequent context switching, such as VM exit/entry during interrupt delivery, incurs significant portion of I/O virtualization performance overhead.

The hypervisor is able to inject a virtual interrupt into a VM only when the hypervisor and the VM both run on the same CPU core. For emulated virtual devices, this causes a VM exit for every interrupt from a back-end driver to one of its associated front-end drivers, because these drivers tend to run on different CPU cores. Also existing mechanisms for timer interrupt delivery trigger VM exits to the hypervisor.

To reduce the number of VM exits, some hardware vendors are pursuing hardware virtualization support for the interrupt controller. A research proposes a binary rewriting technique to reduce the number of VM exits. This mechanism dynamically optimizes the VM's code by identifying instruction pairs that cause consecutive VM exits and dynamically translating the guest code to a variant that incurs fewer VM exits. Another research eliminates VM exits by pre-allocating each resource and para-virtualizing the guest. There is also a mechanism sets a designated system call to enter a real-time mode operation and based on various setting of data structures to reduce the VM exits.

SUMMARY OF THE DISCLOSURE

Exemplary embodiments in accordance of the disclosure provide an interrupts handling method and system in a virtualized environment operable on a computer having one or more CPU cores.

An exemplary interrupts handling method in a virtualized environment operable on a computer having one or more CPU cores, comprises disabling a virtual machine exit triggers by an interrupt that destined to a virtual machine (VM), via a hypervisor of the virtualized environment. The exemplary interrupts handling method further comprises delivering directly one or more interrupts from an I/O virtualization (IOV) device and/or a virtual device that destined to the VM, while the destined VM is running on one of the one or more CPU cores, otherwise delivering the one or more interrupts to the hypervisor to deliver corresponding one or more virtual interrupts to the destined VM.

An exemplary interrupts handling system in a virtualized environment operable on a computer having one or more CPU cores, comprises a hypervisor that disables a virtual machine exit triggers by an interrupt that destined to a virtual machine (VM). The exemplary interrupts handling system further comprises an I/O virtualization (IOV) device and a virtual device, the system delivers directly one or more interrupts from the IOV device and/or from the virtual device that destined to the VM, while the destined VM is running on one of the one or more CPU cores, otherwise delivering the one or more interrupts to the hypervisor to deliver corresponding one or more virtual interrupts to the destined VM.

In order to make the aforementioned and other features and advantages of the disclosure comprehensible, several exemplary embodiments accompanied with Figures are described in details below.

BRIEF DESCRIPTION OF THE DRAWINGS

The accompanying drawings are included as exemplary embodiments to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

Embodiments of a method and system for handling interrupts in a virtualized environment are disclosed. That may handle interrupts from I/O virtualization (IOV) devices, virtual devices, and/or timer to their target virtual machine(s) (VM/VMs) directly without invoking the hypervisor of the virtualized environment on the delivery path as many interrupts delivery schemes usually does in a virtualized environment. Moreover, the disclosed exemplary embodiments may eliminate the number of virtual machine exits associated with each I/O transaction during delivering the corresponding interrupt(s).

Figure 1:
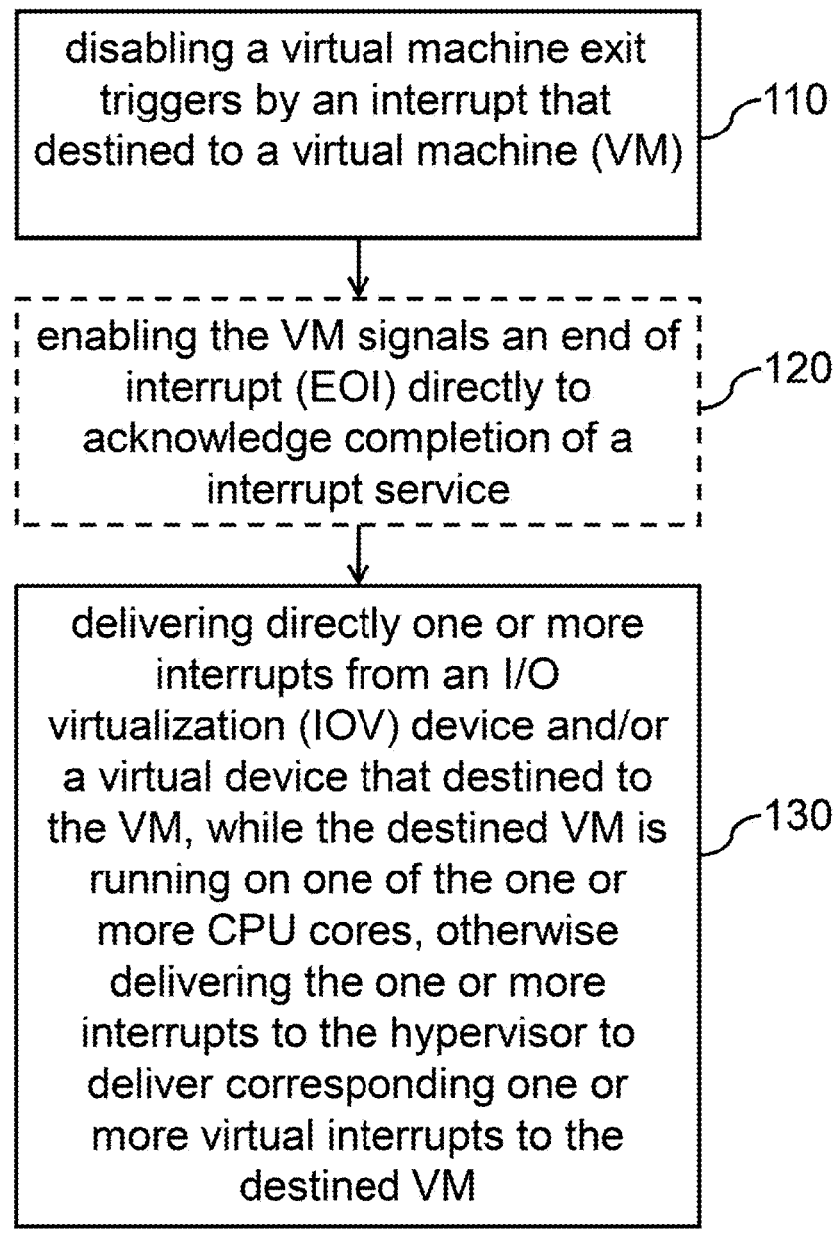
FIG. 1 is a block diagram shows an interrupts handling method in a virtualized environment that may delivery interrupt(s) to a virtual machine directly according to an exemplary embodiment of the disclosure.

FIG. 1 shows an exemplary embodiment of interrupts handling method in a virtualized environment operable on a computer having one or more CPU cores that may delivery interrupt(s) to a virtual machine directly. At block 110, the exemplary interrupts handling method disables a virtual machine exit (VM exit) triggers by an interrupt that destined to a virtual machine (VM), via a hypervisor of the virtualized environment. In one exemplary embodiment the hypervisor clears an external interrupt exiting (EIE) bit of a corresponding control structure of a VM to disable a corresponding VM exit so that delivery of an interrupt to a running VM does not cause a VM exit. In one exemplary embodiment of the exemplary interrupts handling method, the hypervisor may also choose to enable the VM signaling an end of interrupt (EOI) directly to acknowledge completion of an interrupt service, as shows at block 120. Refer to block 130, the exemplary interrupts handling method delivers directly one or more interrupts from an I/O virtualization (IOV) device and/or a virtual device that destined to the VM, while the destened VM is running on one of the one or more CPU cores, otherwise delivering the one or more interrupts to the hypervisor to deliver corresponding one or more virtual interrupts to the destened VM.

When a Virtual Memory M is started on a server with such as an IOV device (for example but not limited, a SRIOV device such as a Network Interrupt Controller (NIC)), it is given a Virtual Function F on the IOV device. Once the binding between M and F is established, M can issue memory-mapped I/O instructions directly to F and F can only interrupt M. In the disclosed exemplary embodiment of direct interrupt delivery (DID), when F generates an interrupt, if M is running, this interrupt goes through, for example but not limited, the PCIe hierarchy, an input output memory management unit, and eventually reaches the local interrupt controller (LIC), for example but not limited, the hardware local advanced programmable interrupt controller (LAPIC), of the CPU core on which M is running in guest mode; otherwise, the disclosed DID mechanism arranges to deliver the interrupt to the hypervisor, which then injects a corresponding virtual interrupt into M.

One exemplary embodiment in accordance with the present disclosure will now be described with reference to FIG. 2, which shows block diagrams of an exemplary interrupts handling method of an IOV device and/or a virtual device as describes in block 130 of FIG. 1. The interrupts handling method, in one exemplary embodiment, may remap an I/O interrupt table's entries associate with an IOV device of a VM, when the hypervisor schedules the VM to run on one of the one or more CPU cores, so that a destination of the IOV device's corresponding interrupts to the VM is the one of the one or more CPU cores that run the VM (block 131). The exemplary interrupts handling method, in one exemplary embodiment, may enable a non-maskable VM exit that triggers by a non-maskable interrupt (NMI) of the VM and changing a delivery mode of the I/O interrupt table's entries associate with the IOV device of the VM to a NMI mode, when the hypervisor de-schedules the VM (block 133). In one exemplary embodiment of the hypervisor may set a non-maskable interrupt (NMI) exiting bit of the corresponding control structure of the VM to enable a non-maskable VM exit. The NMI interrupt forces a VM exit, even when the EIE bit is cleared.

In this exemplary embodiment, when the hypervisor schedules a VM M to run on a CPU core C, it modifies, for example but not limited, the IOMMU's interrupt remapping table entries assigned to M's virtual functions so that the destination of the interrupts generated by these virtual functions is C. This ensures that every IOV device interrupt of M is routed directly to the CPU core assigned to M when M is running Additionally, when the hypervisor de-schedules a VM M, it modifies the IOMMU's interrupt remapping table entries assigned to M's virtual functions so that the delivery mode of the interrupts generated by these virtual functions is changed to a NMI mode. This ensures that every IOV device interrupt for M causes a VM exit and is delivered to the hypervisor as an NMI interrupt when M is not running. The additional remapping of an interrupt table of a VM at the time when the hypervisor schedules and de-schedules the VM enables direct delivery of an IOV device interrupt only when the interrupt's target VM is running.

When an IOV device interrupt is delivered indirectly through the hypervisor, the hypervisor may run on the CPU core on which the interrupt's target VM originally ran, rather than on a dedicated CPU core. This allows the processing overhead of the indirectly-delivered interrupts to be uniformly spread across all CPU cores.

Even when a VM M is running on a CPU core C, it is possible that, when a directly-delivered IOV device interrupt reaches C, C is in fact in host mode (i.e., the hypervisor is running, rather than M). In this case, the hypervisor converts the received interrupt into a virtual interrupt and injects it into M when resuming M's execution.

Figure 2:
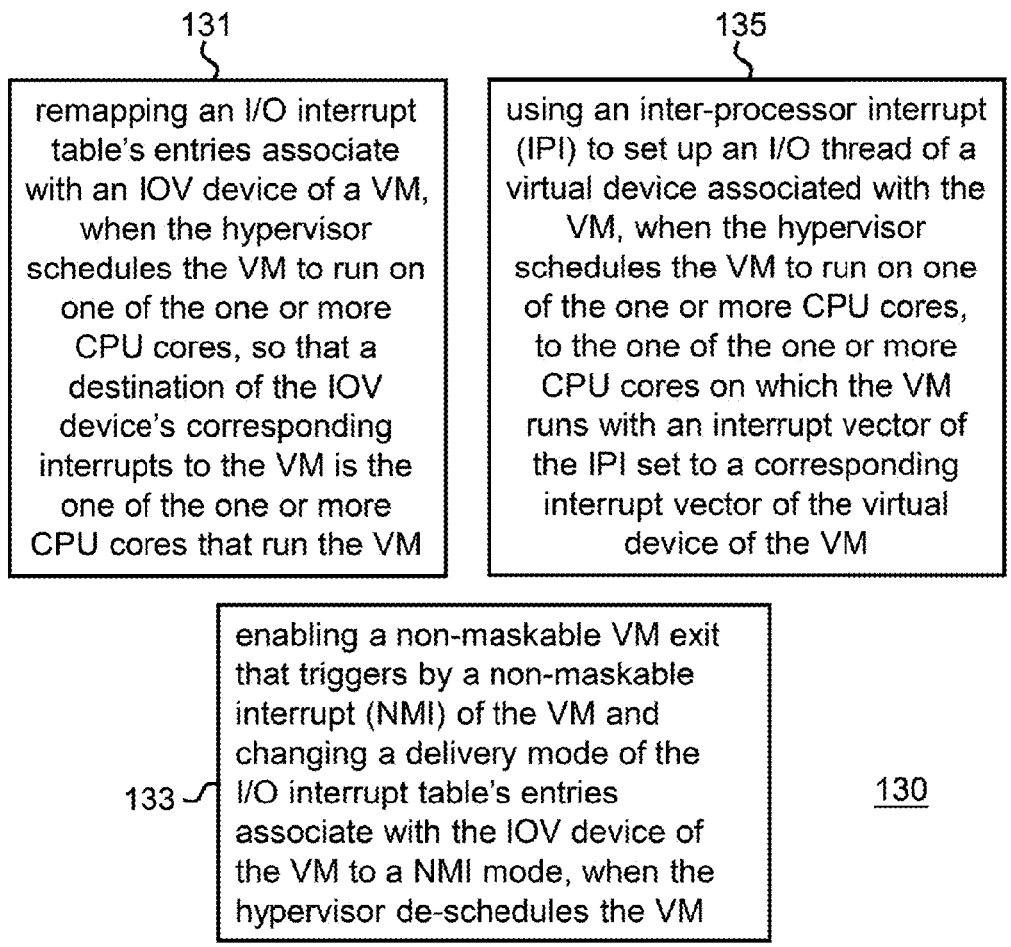
FIG. 2 is block diagrams shows an interrupts handling method of an IOV device and/or a virtual device according to an exemplary embodiment of the disclosure.

In one exemplary embodiment, refer to FIG. 2, the interrupts handling method may use an inter-processor interrupt (IPI) to set up an I/O thread of a virtual device associated with the VM, when the hypervisor schedules the VM to run on one of the one or more CPU cores, to the one of the one or more CPU cores on which the VM runs with an interrupt vector of the IPI set to a corresponding interrupt vector of the virtual device of the VM (block 135). The exemplary interrupts handling method also may enable a non-maskable VM exit as shows in block 133.

The exemplary embodiment uses a self-IPI to inject a virtual interrupt into a VM. Specifically, before the hypervisor resumes a VM, it issues an IPI to its own CPU core. This IPI is then delivered to the injected VM directly after the VM resumes. If multiple virtual interrupts need to be injected into a VM, the hypervisor sets up multiple IPIs, each corresponding to one virtual interrupt.

To exploit parallelism between physical I/O device operation and VM execution, modern hypervisors, such as Kernel VM (KVM), dedicate a thread to each virtual device associated with a VM. Normally, a VM's virtual device thread runs on a different CPU core than the CPU core on which the VM runs. On the disclosed embodiments of DID method and system, when a virtual device thread delivers a virtual device interrupt I to its associated VM M, the virtual device thread first checks if M is currently running, and, if so, issues an IPI to the CPU core on which M runs with the IPI's interrupt vector set to I's interrupt vector. Because the EIE bit is cleared, this IPI is delivered to M without causing a VM exit. The end result is that a virtual device interrupt is directly delivered into its associated VM without a VM exit.

Even though the hypervisor tries to deliver a virtual device interrupt to its associated VM only when the VM is running, there is a possible race condition. An IPI-based virtual device interrupt can only be delivered to a CPU core on which its associated VM should be running, but it is possible for the CPU core to be in host mode rather than in guest mode when the interrupt is delivered. In this situation, the hypervisor accepts the IPI on behalf of the associated VM, converts the IPI-based virtual device interrupt into a virtual interrupt and injects it into the associated VM before resuming guest execution.

In an environment without disclosed DID mechanism when a VM sends an end of interrupt (EOI) acknowledgement, it goes to the hypervisor. The hypervisor then signals an EOI, for example but not limited, by writing to a hardware EOI register. In one exemplary embodiment of the disclosure the hypervisor may enable the VM signals an EOI directly to acknowledge the completion of an interrupt service. In the embodiment, when an interrupt handler completes servicing an interrupt request IRQ, it signals completion of interrupts by, for example but not limited, writes to an EOI register on the associated local interrupt controller (LIC) of the target CPU core to acknowledge that the service of the current interrupt is finished and the LIC is allowed to deliver the next pending interrupt. Although it is desirable to avoid a VM exit when a VM signals the associated EOI, there may be undesirable side effects if signaling the EOI does not involve the hypervisor.

Figure 3:
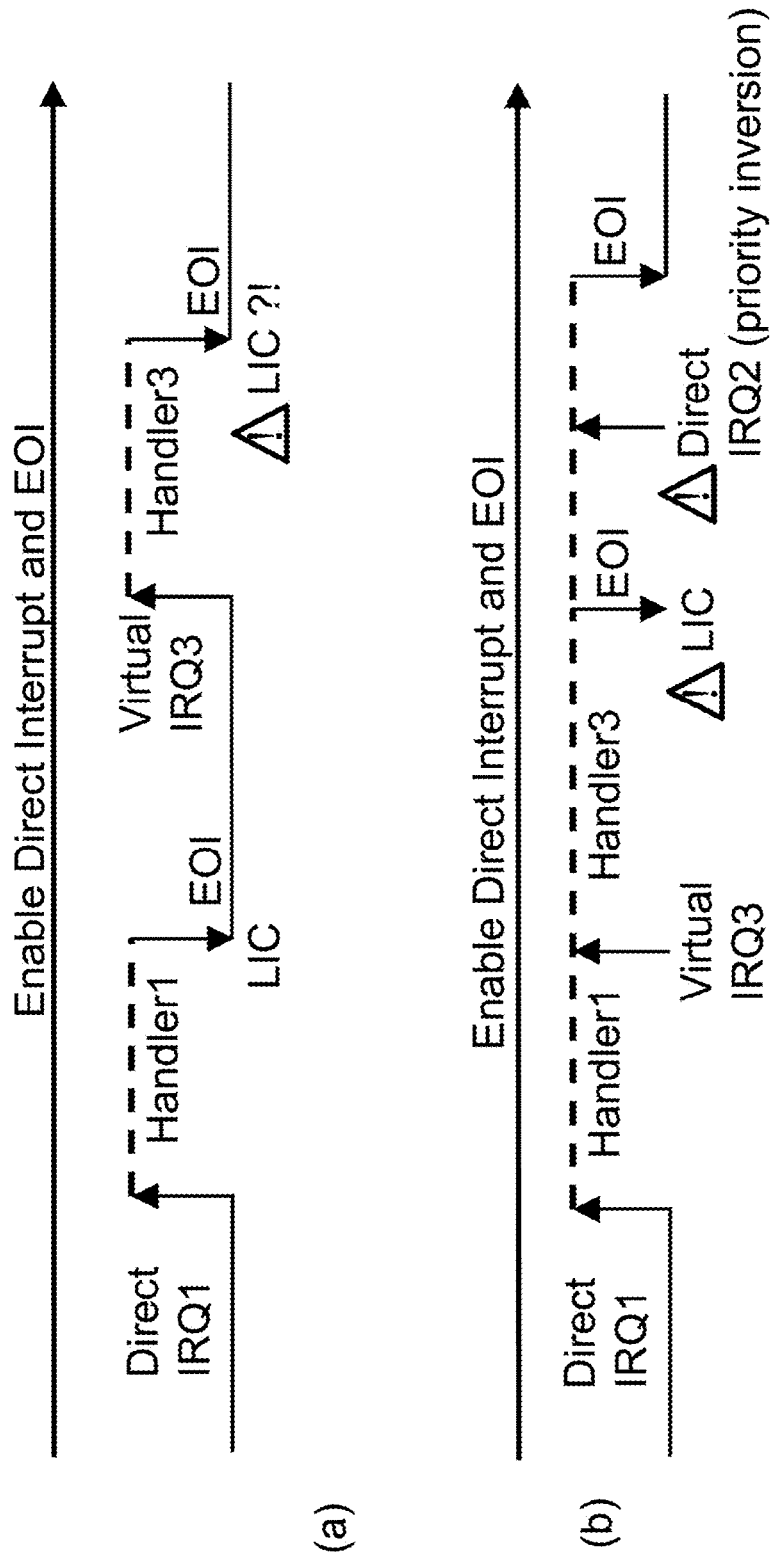
FIG. 3 is a schematic diagram shows possible issues that may occur when allowing a VM triggers an EOI signal directly.

FIG. 3 is a schematic diagram shows possible issues that may occur when allowing a VM triggers an EOI signal directly and mixing direct/virtual interrupt causes priority inversion. In FIG. 3, it assumes that priority of IRQ3>IRG1>IRG2. If the handler of a virtual interrupt directly signals the EOI, the LIC may receive an EOI notification of virtual interrupt IRQ3 when it thinks there is no pending interrupt, as shown in FIG. 3 (a), or may think the currently pending interrupt is already completed when in fact it is still on-going (e.g., IRQ3 in FIG. 3 (b)), as shown in FIG. 3 (b). Moreover, the LIC may incorrectly dispatch a lower-priority interrupt (e.g., direct interrupt IRQ2 in FIG. 3 (b)) to preempt a higher-priority interrupt (e.g., direct interrupt IRQ1), because the handler for the virtual interrupt IRQ3 signals the EOI directly. The cause of this priority inversion problem is that virtual interrupts are not visible to the LIC when they are injected, for example but not limited, via software emulation of interrupt request/service registers.

The disclosed IPI-based virtual interrupt injection mechanism may eliminate the priority inversion problem due to direct signalling of EOI. When a virtual interrupt is delivered in the form of an IPI, it becomes visible to the target CPU core's LIC, enabling it to compete with other direct and virtual interrupts. Because a LIC observes every interrupt be delivered to its associated CPU core and every EOI signal, it allows the system to not mistake an in-service interrupt for being completed when in fact it is not and to not deliver a new interrupt prematurely. In one embodiment, using special IPIs whose delivery mode is set to NMI. The NMI setting forces a VM exit on the target CPU core, enabling the hypervisor to regain control and take proper actions corresponding to the special IPIs.

Regardless of whether or not the hypervisor runs on the same CPU core as the VM into which a virtual interrupt is being injected, the disclosed exemplary DID embodiments uses the same IPI-based mechanism (with proper interrupt vector setting) to deliver the virtual interrupt. When the source and destination involved in a virtual interrupt delivery run on different CPU cores, no VM exit is needed. Also, because each virtual interrupt takes the form of a hardware interrupt (i.e., IPI) and goes through the target CPU core's LIC, the priority among interrupts delivered to a CPU core is delivered, directly or otherwise.

Figure 4:
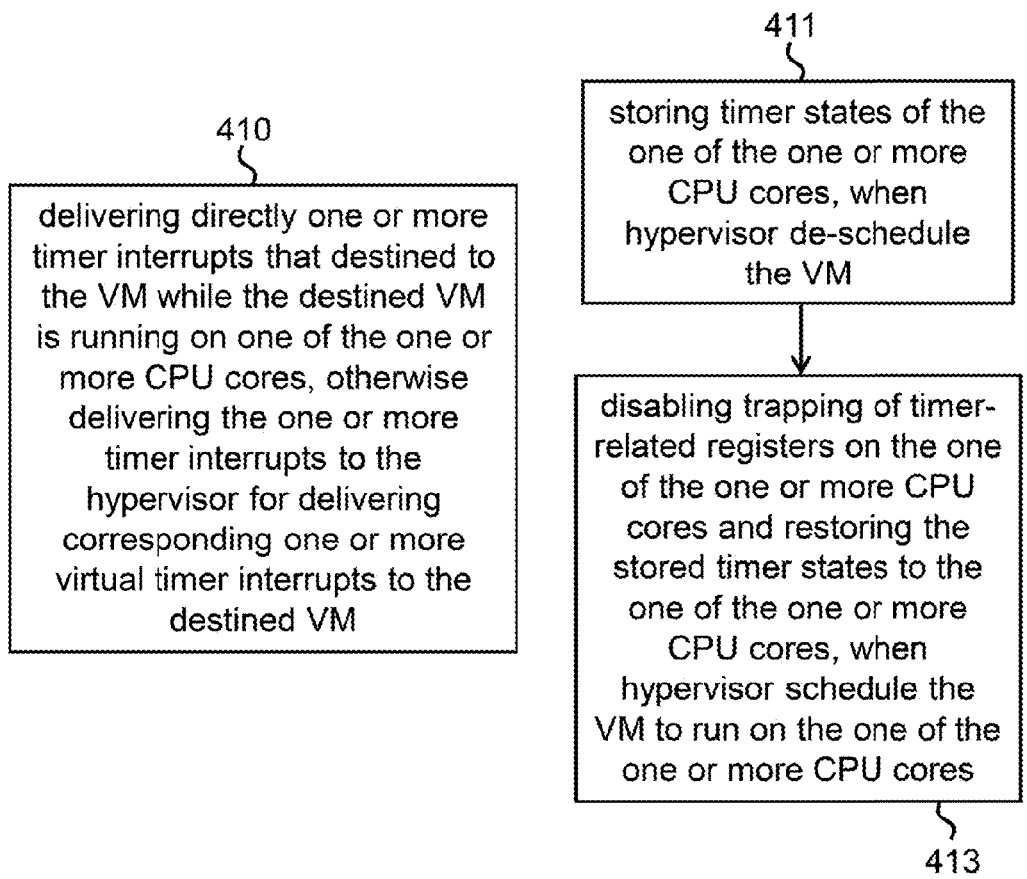
FIG. 4 is block diagrams shows an interrupts handling method that may delivery a timer interrupt to a VM directly according to an exemplary embodiment of the disclosure.

Another exemplary embodiment in accordance with the present disclosure is described with reference to FIG. 4, which shows block diagrams of an exemplary interrupts handling method that may delivery interrupt from a hardware timer to its target VMs directly. The interrupts handling method, in one exemplary embodiment as shows in FIG. 4, may further deliver directly one or more timer interrupts that destined to the VM while the destined VM is running on one of the one or more CPU cores, otherwise delivering the one or more timer interrupts to the hypervisor for delivering corresponding one or more virtual timer interrupts to the destined VM (block 410). In one exemplary embodiment, refer to FIG. 4, the interrupts handling method may store timer states (for example, timer related registers and other timer status etc.) of the one of the one or more CPU cores, when hypervisor de-schedule the VM (block 411); and disable trapping of timer-related registers on the one of the one or more CPU cores and restoring the stored timer states to the one of the one or more CPU cores, when hypervisor schedule the VM to run on the one of the one or more CPU cores (block 413). In one exemplary embodiment, the interrupts handling method may further enabling a non-maskable VM exit that triggers by a non-maskable interrupt (NMI) of the VM and changing a delivery mode of the I/O interrupt table's entries associate with the timer of the VM to a NMI mode, when the hypervisor de-schedules the VM.

Figure 5:
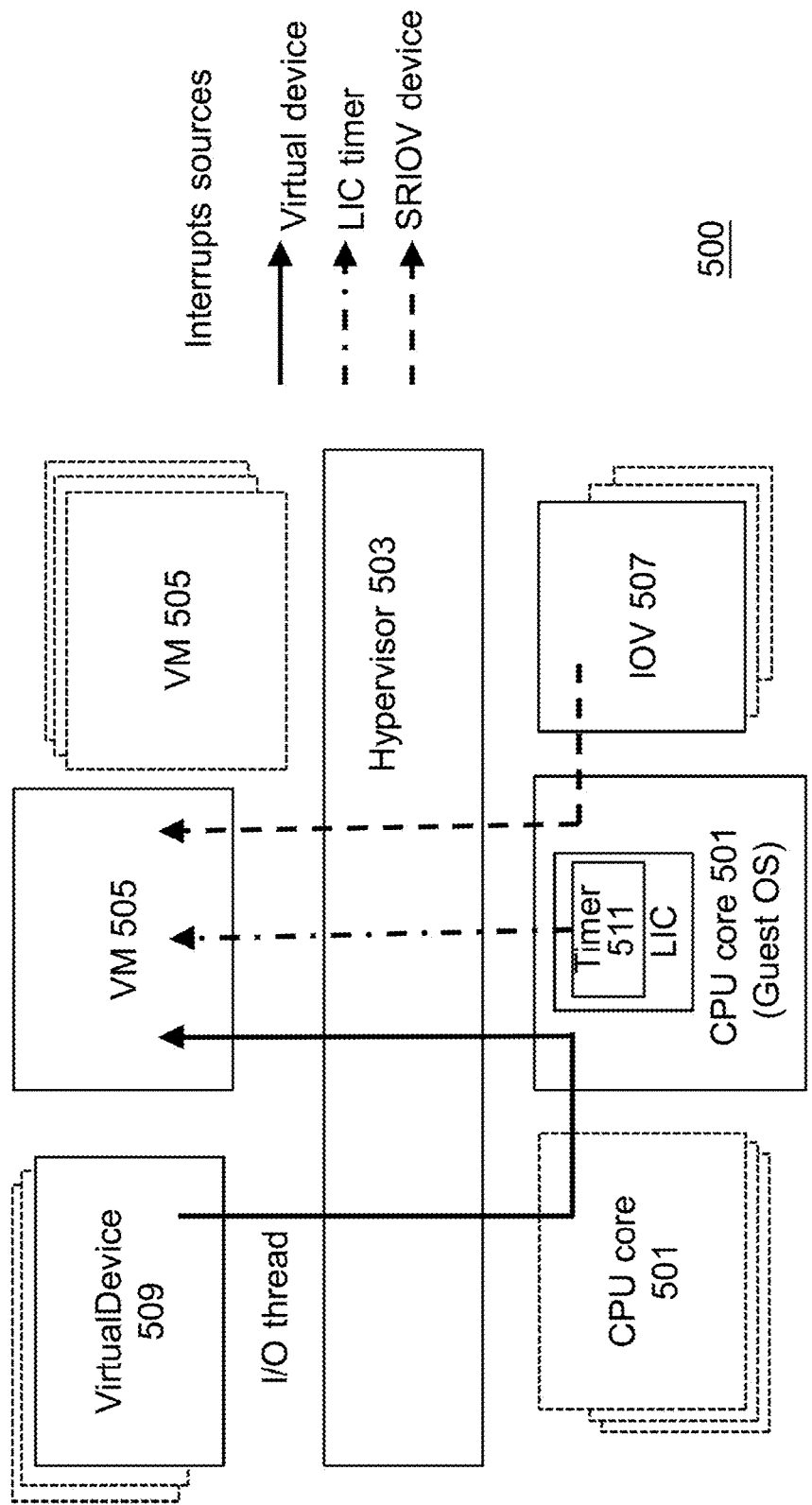
FIG. 5 is a block diagram shows an interrupts handling system in a virtualized environment that delivery interrupt(s) directly according to an exemplary embodiment of the disclosure.

One exemplary embodiment in accordance with the present disclosure will now be described with reference to FIG. 5, which shows an interrupts handling system 500 in a virtualized environment operable on a computer having one or more CPU cores 501. The system 500 having at least one or more CPU cores 501s, a hypervisor 503, one or more virtual machine (VM) 505, one or more I/O virtualization (IOV) devices 507 and one or more virtual devices 509. The hypervisor 503 disables a virtual machine exit (VM exit) triggers by an interrupt that destined to a VM 505 and an IOV device 507 and a virtual device 509, the system 500 delivers directly one or more interrupts from the IOV device 507 and/or from the virtual device 509 that destined to the VM 505, while the destined VM 505 is running on one of the one or more CPU cores 501, otherwise delivering the one or more interrupts to the hypervisor 503 to deliver corresponding one or more virtual interrupts to the destined VM. The hypervisor 503, in one exemplary embodiment, may clear an external interrupt exiting (EIE) bit of a corresponding control structure of the VM 505 to disable a VM exit.

The interrupts handling system, in one exemplary embodiment, may remap an I/O interrupt table's entries associate with the IOV device 507 of the VM 505, when the hypervisor 503 schedules the VM 505 to run on one of the one or more CPU cores 501, so that a destination of the IOV device's corresponding interrupts to the VM 505 is the one of the one or more CPU cores 501 that run the VM 505; and may enable a non-maskable VM exit that triggers by a non-maskable interrupt (NMI) of the VM 505 and changing a delivery mode of the I/O interrupt table's entries associate with the IOV device 507 of the VM 505 to a NMI mode, when the hypervisor 503 de-schedules the VM 505.

One exemplary embodiment of the interrupts handling system, may further set up an I/O thread of the virtual device 509 associated with the VM 505 to use an inter-processor interrupt (IPI), when the hypervisor 503 schedules the VM 505 to run on one of the one or more CPU cores 501, to the one of the one or more CPU cores 501 on which the VM 505 runs with an interrupt vector of the IPI set to a corresponding interrupt vector of the virtual device 509 of the VM 505. When the hypervisor 503 de-schedules the VM 505, may enable a non-maskable VM exit that triggers by a non-maskable interrupt (NMI) of the VM 505 and changing a delivery mode of an I/O interrupt table's entries associate with the virtual device 509 of the VM 505 to a NMI mode, and converting the IPI interrupt of the I/O thread into a corresponding virtual interrupt.

In one exemplary embodiment, the hypervisor 503 may set a NMI exiting bit of a corresponding control structure of the VM 505 to enable a non-maskable VM exit. The hypervisor, in one exemplary embodiment, may also choose to enable the VM 505 signals an end of interrupt (EOI), for example but not limited the VM 505 writes to an EOI register directly, to acknowledge completion of an interrupt service of the corresponding interrupt handler.

The interrupts handling system, in one exemplary embodiment, may further includes a timer 511 of a LIC, the system 500 delivers directly one or more interrupts of the timer 511 that destined to the VM 505 while the destined VM 505 is running on one of the one or more CPU cores 501, otherwise delivering the one or more interrupts of the timer 511 to the hypervisor 503 for delivering a corresponding one or more virtual timer interrupts to the destined VM 505.

The interrupts handling system, in one exemplary embodiment, may further store states of timer 511 of the one of the one or more CPU cores 501, when hypervisor 503 de-schedule the VM 505; and disabling trapping of timer-related registers on the one of the one or more CPU cores 501 and restoring the stored timer states to the one of the one or more CPU cores 501, when hypervisor 503 schedule the VM 505 to run on the one of the one or more CPU cores 501. In one exemplary embodiment, the interrupts handling system may further enabling a non-maskable VM exit that triggers by a non-maskable interrupt (NMI) of the VM and changing a delivery mode of the I/O interrupt table's entries associate with the timer of the VM to a NMI mode, when the hypervisor de-schedules the VM.

Take an example of x86 servers, timer interrupts are associated with the per-core LAPIC and the hypervisor virtualizes LAPIC timer to the VMs.

Due to the timer interrupts do not pass through an interrupt remapping table before reaching their target CPU core, the hypervisor does not have the flexibility of modifying how a timer interrupt is delivered after it is set up. Consequently, if a timer interrupt is delivered directly, without involving the hypervisor, a timer set up by a VM can be erroneously delivered to the hypervisor, if the target CPU core is in host mode or it can be delivered to the wrong VM if another VM is running on the target CPU core at the time of timer expiration.

When the hypervisor schedules a VM M on a CPU core C, the timers that M configured are installed on C's hardware timer; when the hypervisor de-schedules a VM M from CPU core C, the timers that M configured are removed from C's hardware timer and the hardware timer of the designated CPU core is back to and used by the hypervisor. Except for the designated CPU core, the only timers installed on a CPU core's hardware timer are set up by the VM currently running on that CPU core. On the designated CPU core, the hypervisor is prepared to service timer interrupts configured by the hypervisor and by those VMs that are not currently running. The timer interrupts destined to non-running VMs are delivered to them as virtual interrupts when those VMs are resumed.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An interrupts handling method in a virtualized environment operable on a computer having one or more CPU cores, comprising:
   disabling a virtual machine exit (VM exit) triggered by an interrupt that is destined to a virtual machine (VM), via a hypervisor of the virtualized environment; and
   delivering directly one or more interrupts from an I/O virtualization (IOV) device and/or a virtual device that is destined to the VM, while the destined VM is running on one of the one or more CPU cores, otherwise delivering the one or more interrupts to the hypervisor to deliver corresponding one or more virtual interrupts to the destined VM,
   wherein when the hypervisor schedules the VM to run on one of the one or more CPU cores, an I/O interrupt table's entries associated with the IOV device of the VM is remapped, so that a destination of the IOV device's corresponding interrupts to the VM is the one of the one or more CPU cores that run the VM; and
   when the hypervisor de-schedules the VM, a non-maskable VM exit that is triggered by a non-maskable interrupt (NMI) of the VM is enabled and a delivery mode of the I/O interrupt table's entries associated with the IOV device of the VM is changed to a NMI mode.

2. The interrupts handling method of claim 1, further comprising:
   enabling the VM signals an end of interrupt (EOI) directly to acknowledge completion of an interrupt service, via the hypervisor.

3. The interrupts handling method of claim 1, further comprising:
   clearing an external interrupt exiting (EIE) bit of a corresponding control structure of the VM to disable said VM exit, via the hypervisor.

4. The interrupts handling method of claim 1, wherein enabling the non-maskable VM exit that is triggered by said NMI further comprises:
   setting a NMI exiting bit of a corresponding control structure of the VM to enable said non-maskable VM exit.

5. The interrupts handling method of claim 1, further comprising:
  delivering directly one or more timer interrupts that is destined to the VM while the destined VM is running on one of the one or more CPU cores, otherwise delivering the one or more timer interrupts to the hypervisor for delivering corresponding one or more virtual timer interrupts to the destined VM.

6. The interrupts handling method of claim 5, further comprising:
  storing timer states of the one of the one or more CPU cores, when the hypervisor de-schedules the VM; and
  disabling trapping of timer-related registers on the one of the one or more CPU cores and restoring the stored timer states to the one of the one or more CPU cores, when the hypervisor schedules the VM to run on the one of the one or more CPU cores.

7. The interrupts handling method of claim 1, wherein the hypervisor runs on the one of the one or more CPU cores on which the destined VM originally ran.

8. An interrupts handling system in a virtualized environment operable on a computer having one or more CPU cores, comprising:
  a hypervisor that disables a virtual machine exit (VM exit) triggers triggered by an interrupt that is destined to a virtual machine (VM); and
  an I/O virtualization (IOV) device and a virtual device, said system delivers directly one or more interrupts from the IOV device and/or from the virtual device that is destined to the VM, while the destined VM is running on one of the one or more CPU cores, otherwise delivering the one or more interrupts to the hypervisor to deliver corresponding one or more virtual interrupts to the destined VM,
  wherein an I/O interrupt table's entries associated with the IOV device of the VM is remapped, when the hypervisor schedules the VM to run on one of the one or more CPU cores, so that a destination of the IOV device's corresponding interrupts to the VM is the one of the one or more CPU cores that run the VM; and
  a non-maskable VM exit that is triggered by a non-maskable interrupt (NMI) of the VM is enabled and a delivery mode of the I/O interrupt table's entries associated with the IOV device of the VM is changed to a NMI mode, when the hypervisor de-schedules the VM.

9. The interrupts handling method of claim 8, wherein the hypervisor further enables the VM signaling an end of interrupt (EOI) directly to acknowledge completion of an interrupt service.

10. The interrupts handling system of claim 8, wherein the hypervisor further clears an external interrupt exiting (EIE) bit of a corresponding control structure of the VM to disable said VM exit.

11. The interrupts handling system of claim 8, wherein enabling the non-maskable VM exit that is triggered by said NMI further comprises:
  setting a NMI exiting bit of a corresponding control structure of the VM to enable said non-maskable VM exit, via the hypervisor.

12. The interrupts handling system of claim 8, further comprising:
  a timer, said system delivers directly one or more interrupts of the timer that is destined to the VM while the destined VM is running on one of the one or more CPU cores, otherwise delivering the one or more interrupts of the timer to the hypervisor for delivering a corresponding one or more virtual timer interrupts to the destined VM.

13. The interrupts handling system of claim 12, where the system further comprising:
  storing timer states of the one of the one or more CPU cores, when the hypervisor de-schedules the VM; and
  disabling trapping of timer-related registers on the one of the one or more CPU cores and restoring the stored timer states to the one of the one or more CPU cores, when the hypervisor schedules the VM to run on the one of the one or more CPU cores.

14. The interrupts handling system of claim 8, wherein the hypervisor runs on the one of the one or more CPU cores on which the destined VM originally ran.

15. An interrupts handling method in a virtualized environment operable on a computer having one or more CPU cores, comprising:
  disabling a virtual machine exit (VM exit) triggered by an interrupt that is destined to a virtual machine (VM), via a hypervisor of the virtualized environment; and
  delivering directly one or more interrupts from an I/O virtualization (IOV) device and/or a virtual device that is destined to the VM, while the destined VM is running on one of the one or more CPU cores, otherwise delivering the one or more interrupts to the hypervisor to deliver corresponding one or more virtual interrupts to the destined VM,
  wherein an inter-processor interrupt (IPI) is used to set up an I/O thread of the virtual device associated with the VM, when the hypervisor schedules the VM to run on one of the one or more CPU cores, to the one of the one or more CPU cores on which the VM runs with an interrupt vector of the IPI set to a corresponding interrupt vector of the virtual device of the VM; and
  a non-maskable VM exit that is triggered by a non-maskable interrupt (NMI) of the VM is enabled and a delivery mode of an I/O interrupt table's entries associated with the virtual device of the VM is changed to a NMI mode, and said IPI interrupt of the I/O thread is converted into a corresponding virtual interrupt, when the hypervisor de-schedules the VM.

16. The interrupts handling method of claim 15, wherein enabling the non-maskable VM exit that is triggered by said NMI further comprises:
  setting a NMI exiting bit of a corresponding control structure of the VM to enable said non-maskable VM exit.

17. The interrupts handling method of claim 15, further comprising:
  enabling the VM signals an end of interrupt (EOI) directly to acknowledge completion of an interrupt service, via the hypervisor.

18. An interrupts handling system in a virtualized environment operable on a computer having one or more CPU cores, comprising:
  a hypervisor that disables a virtual machine exit (VM exit) triggered by an interrupt that is destined to a virtual machine (VM); and
  an I/O virtualization (IOV) device and a virtual device, said system delivers directly one or more interrupts from the IOV device and/or from the virtual device that is destined to the VM, while the destined VM is running on one of the one or more CPU cores, otherwise delivering the one or more interrupts to the hypervisor to deliver corresponding one or more virtual interrupts to the destined VM, wherein an inter-processor interrupt (IPI) is used to set up an I/O thread of the virtual device associated with the VM, when the hypervisor schedules the VM to run on one of the one or more CPU cores, to the one of the one or more CPU cores on which the VM runs with an interrupt vector of the IPI set to a corresponding interrupt vector of the virtual device of the VM; and a non-maskable VM exit that is triggered by a non-maskable interrupt (NMI) of the VM is enabled and a delivery mode of an I/O interrupt table's entries associated with the virtual device of the VM is changed to a NMI mode, and said IPI interrupt of the I/O thread is converted into a corresponding virtual interrupt, when the hypervisor de-schedules the VM.

19. The interrupts handling system of claim 18, wherein enabling the non-maskable VM exit that is triggered by said NMI further comprises:

setting a NMI exiting bit of a corresponding control structure of the VM to enable said non-maskable VM exit, via the hypervisor.

20. The interrupts handling system of claim 18, wherein the hypervisor further enables the VM signaling an end of interrupt (EOI) directly to acknowledge completion of an interrupt service.

* * * * *